United States Patent

[11] 3,628,103

[72] Inventor James M. Booe
 Indianapolis, Ind.
[21] Appl. No. 819,788
[22] Filed Apr. 28, 1969
[45] Patented Dec. 14, 1971
[73] Assignee P. R. Mallory & Co. Inc.
 Indianapolis, Ind.

[54] CATHODE FOR WET ELECTROLYTE CAPACITORS
 9 Claims, 1 Drawing Fig.
[52] U.S. Cl. .................................................. 317/230,
 317/233
[51] Int. Cl. ........................................................ H01g 9/04
[50] Field of Search ........................................... 317/230,
 231, 232, 233

[56] References Cited
UNITED STATES PATENTS

| | | | |
|---|---|---|---|
| 2,871,425 | 1/1959 | Burnham ..................... | 317/230 |
| 2,871,426 | 1/1959 | Hilton et al. ................. | 317/230 |
| 2,923,866 | 2/1960 | Wagner ....................... | 317/230 |
| 3,056,072 | 9/1962 | Schroeder et al. ........... | 317/230 |
| 3,082,360 | 3/1963 | Robinson et al. ............. | 317/230 |
| 3,243,316 | 3/1966 | O'Nair et al. ................. | 317/230 |
| 3,461,355 | 8/1969 | Fry ............................... | 317/230 |

Primary Examiner—James D. Kallam
Attorneys—Richard H. Childress, Robert F. Meyer, Henry W. Cummings and C. Carter Ells, Jr.

ABSTRACT: In an electrolytic capacitor, a layer of gold, platinum or gold platinum alloy constitutes the cathode, thereby permitting the capacitor to withstand reversals of polarity. Finely divided material such as carbon or platinum may be applied to the surface of the layer to increase the effective surface area of the cathode.

Patented Dec. 14, 1971
3,628,103
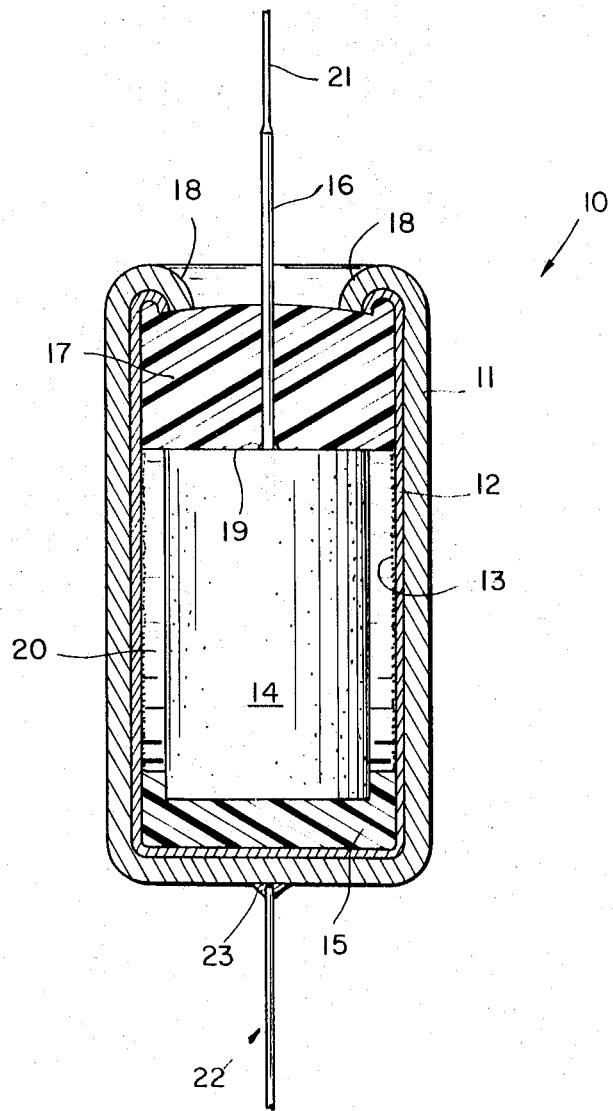
INVENTOR
JAMES M. BOOE
BY
Henry W. Cummings
ATTORNEY

CATHODE FOR WET ELECTROLYTE CAPACITORS

In some applications, it may be desired or required that capacitors used in circuits have the capability of withstanding reversed polarity. Some applications require the capacitor to withstand appreciable reversed polarity and for these applications a nonpolar type of capacitor is employed. If the capacitor is of the electrolytic type, then both electrodes are made of a film-forming metal such as tantalum, niobium, aluminum, etc. Such capacitors require considerable space and are expensive. In one conventional wet electrolyte capacitor, a silver cathode is employed with a sulfuric acid electrolyte and a tantalum or niobium anode. Reversal of potential causes silver to be dissolved in the electrolyte and, eventually, it will be electrodeposited on the tantalum electrode after prolonged electrification which is working as a cathode under this condition. In this capacitor system, only a few millivolts reversed polarity will cause appreciable reverse current. Upon reestablishing the normal polarity, a high DC leakage current may result due to electrolytic dissolution of silver which has deposited on the tantalum electrode by the reverse polarity. This may not permit the capacitor to immediately attain its normal voltage. This may continue until a substantial amount of silver is anodically dissolved from the tantalum electrode, after which the capacitor may operate normally.

It is an object of the present invention to provide an inexpensive capacitor of the wet electrolyte type having the capability of withstanding low values of reversed polarity.

It is another object of the present invention to provide a capacitor which will withstand reversals of polarity at elevated temperatures.

It is another object of the present invention to provide a wet electrolyte type capacitor which conserves space.

It is another object of the present invention to provide a wet electrolyte capacitor which avoids the cathode being dissolved in the electrolyte and deposited on the tantalum electrode during reversals of polarity.

It is another object of the present invention to provide a wet electrolyte capacitor which gives low values of DC leakage during reversals of polarity.

It is another object of the present invention to provide a wet electrolyte capacitor which does not require prolonged operation to obtain low values of DC leakage after there has been a reversal of polarity.

Other objects will be apparent from the following description and drawing.

The FIG. is a schematic sectional view of the cathode and capacitor of the present invention.

In order to achieve the foregoing objects, an impervious layer of gold or platinum constitutes the inner surface of the cathode in contact with the electrolyte. Additionally, certain alloys of gold and platinum, such as Pt in Au up to about 25 wt. percent and gold in Pt up to about 5 wt. percent may be used. Gold and platinum and these alloys are substantially unaffected when made anodic in many nonhalide electrolytes including sulfuric acid. Although these metals may assume a slight oxidation during operation as anode, they do not appreciably dissolve for example in a sulfuric acid electrolyte with a tantalum electrode even after many thousands of hours of operation under reversed bias conditions to the extent of up to about 1.5 volts and up to 2.0 volts and higher for short periods of time.

If a reversed potential of much above this is applied, then appreciable current will flow through the capacitor. Although this condition will not attack the gold or platinum, oxygen gas may be liberated from the electrolyte at the electrolyte-Au/Pt interface and, hydrogen gas may be liberated from the electrolyte at the tantalum electrode. These conditions are deleterious to the capacitor.

Since gold and platinum are costly materials, it is highly uneconomical to employ these metals as the entire cathode container, although this could be done if desired; gold, platinum and the gold-platinum alloys mentioned above may be formed into container cans by well-known methods. Preferably, however, the thinnest layer of Au or Pt or the Au-Pt alloys mentioned above which are essentially pore free, is applied to a can made of less expensive material, since the thicker the Au or Pt layer, the more costly the capacitor. For example, a layer of about 0.0001 to about 0.005 inch, preferably 0.0005 to 0.003 inch thick may be used as a liner inside a cathode container of some other acceptable metal.

With respect to employing the thin films or layers of gold or platinum, or the above alloys of gold and platinum, these layers should be essentially free from imperfections such as pinholes which would permit the electrolyte to come in contact with the supporting metal or structural case or cladding metal of the capacitor and dissolve a portion of the case, which may then be electrodeposited at the tantalum electrode during periods of reversed polarity. By essentially pore free is meant that the layer must be sufficiently devoid of pores that upon reversals of polarity the ultimate leakage current from the anode to the gold, platinum or gold-platinum alloy is at most under 1 microampere per square inch cathode area at voltages up to 1.0 v.

Although virtually any metal can be used for the container which can be formed into a can and to which the liner can be affixed, the preferred metals are silver and copper and their alloys. Silver and copper and their alloys are preferred primarily because of their resistance to chemical attack including attack by electrolytes such as sulfuric acid should there be imperfections in the gold or platinum lining, which would allow the electrolyte to permeate to the outer casing. In the absence of oxygen or oxidizing agents, these metals and alloys are not chemically attacked. The most preferred can materials are elemental copper, elemental silver and alloys of Cu and alloys of silver for example including brass, bronze and Ni-Cu alloys such as monel. Also cans of low carbon steel, alloy steel or stainless steel or other strong metals may be used where the application requires severe strength and/or rigidity.

As is known to those skilled in the art, there are various ways to apply the layer to the inner surface of the container and the invention is in no way to be limited by the particular method chosen. One method involves electrodepositing the Au or Pt on a smooth mandrel, such as electropolished stainless steel. This deposit is preferably burnished to close any pores. The mandrel is then pressed into an outer casing to apply the layer to the case. Another method involves masking one side of a Ag or Cu sheet and then electroplating the layer on the unmasked side. The plated sheet is then preferably rolled to close any pores, then stamped and drawn into cathode cases.

However, the preferred way is to form a bimetal of the can material for instance, copper or silver, or their alloys with a thin layer of gold, platinum or gold/platinum alloys by roll bonding which ensures the layer will be essentially free of pores and, furthermore, ensures a relatively uniform thickness of the layer. For example, Ag and Au may be heated together at a temperature and time sufficient to form a diffusion bond, for example at 800° C. and then hot-rolled to enhance the bond and provide initial reduction. One or more additional hot or cold rolling steps with intermediate anneals if required may be carried out to obtain desired gauge. The above operation should preferably be carried out under clean, ambient conditions to avoid foreign substances or particles being embedded into the surface to form pinholes or other imperfections. With these bimetals, the cylindrical cathode cans or cases can be drawn or spun by standard methods well known in the art.

The gold, silver or Au-Ag alloy layer does not have sufficient surface area to enable good capacitor operation for many applications from the dynamic standpoint or when alternating current is flowing through the capacitor. It is desired to have the anode exhibit near its full capacitance, the cathode preferably has about 100 times the capacitance of that of the anode or higher. In order to achieve this, it is generally necessary to increase the effective surface area of the cathode. One way of increasing the effective surface is to employ an acceptable material having very high surface area and having very high chemical and electrochemical resistance to the electrolyte. This material is applied to the surface of the gold, platinum, or Au/Pt alloy. For example, such materials include finely divided Pt, Au, Au/Pt alloys, carbon and mixtures of the foregoing.

Platinum for this use may be applied for example by electrodeposition from a platinizing solution such as chloroplatinic acid, $H_2PtCl_6$, or a paint composition of platinum black may be used. The carbon or graphite may be applied as a paint having a suitable binder, for example, as described in U.S. Pat. No. 3,243,316, to hold the particles in place and to maintain electrical contact with the gold, platinum or gold/platinum alloy surface. Other methods of application may be used within the scope of the present invention, the foregoing being by way of example only.

The electrolyte to be used in the capacitor of the present invention must be one in which Au, Pt, or Au/Pt alloys do not dissolve anodically to an appreciable extent and which has a sufficiently high decomposition voltage to withstand the reverse voltages and which has sufficient conductivity to operate effectively in normal operation. While sulfuric acid is the preferred electrolyte, it will be apparent to those skilled in the art that other electrolytes may also be used, for example, including nitric acid and phosphoric acid. For certain applications, it would be permissible to employ the alkali metal salts of these acids as electrolytes (Li, Na, K, Rb, Cs).

Capacitors utilizing the essentially pore-free Au, Pt or Au/Pt alloy layer on the cathode area, the ratio of reverse DC leakage current of silver cathode capacitors to capacitors having a gold coated cathode is usually at least 50,000. This ratio is reached within about 30 minutes of electrification at reverse voltage of about 0.8 volts. At lower reverse voltages, this ratio is lower and at higher reverse voltages and longer times it is generally higher, often going to as much as 100,000 after about 1 hour.

While the DC leakage will generally increase with increasing cathode area, the ratio obtained is substantially independent of the cathode area.

The higher ratios are obtained on reversed voltage values of up to the order of about 2 volts.

After a reversal of about 1 volt, the reverse DC leakage is nearly always below 10 microamps and generally below about 1.0 microamp ($10^{-6}$ amps) for a cathode area of about 0.25 sq. inches after electrification and a stable condition is achieved.

The capacitors may be operated on a continuous basis at reversed voltages up to about 1.5 volts and can be occasionally subjected to reversed voltages of the order of about two volts and higher for short periods of time.

The capacitance which can be obtained with the capacitors of the present invention depends upon the capacitance of the anode and the capacitance of the cathode according to the relation $$1/C = (1/C)_A + (1/C)_C$$

where $C$ is the capacitance of the capacitor, $C_A$ is the capacitance of the anode and $C_C$ is the capacitance of the cathode.

In general, $C_C$ must be of the order of 100 times that of $C_A$ for the capacitor to develop near full capacitance of the anode.

For example, the capacitors of the present invention will develop a capacitance of up to the order of 500 microfarads at 6 volts forward for a capacitor length of approximately eleven-sixteenths inch by seven thirty-seconds inch outside diameter. Higher and lower capacitance values can be obtained as desired by those skilled in the art such as about 2 $\mu f$. in small capacitors to 2,000 $\mu f$. depending on the size and voltage.

The capacitors of the present invention may be operated at temperatures as low as of the order of $-70°$ C., depending upon the electrolyte, or as high as about $+125°$ C. However, at higher temperatures the reverse leakage current increases above the room temperature values hereinbefore disclosed.

An exemplary embodiment of the invention is shown in FIG. 1. In this drawing a capacitor 10 is shown having a silver can or housing 11. The can is coated with a layer of gold 12 according to one of the methods described hereinbefore. Additionally, a layer of finely divided material such as platinum is applied to layer 12 at 13 to increase the effective surface area of the cathode. The anode is illustrated at 14 which is held in place by spacer 15. A Ta lead 16 passes through a seal 17 which, for example, may be made of a suitable elastomeric material. It is held in place within housing 11 by crimping as indicated at 18.

The seal 19 is illustrated as being very simple in construction in which the elastomeric material contains an opening for anode lead 16. Obviously, the particular seal construction may vary as desired by those skilled in the art to meet the requirements of particular applications. The Ta lead is welded to the anode at 19. An electrolyte, for example, sulfuric acid, fills the space 20 between the anode and the cathode. The anode lead is conductively attached such as by welding or soldering to a circuit wire 21. The cathode lead 22 is attached to the can or housing by welding or soldering as indicated at 23.

It will be apparent to those skilled in the art that many other sealing arrangements may be used in conjunction with the cathode and capacitor of the present invention and still fall within the scope thereof. Obviously, other geometries and compositions may be used for the seal.

Likewise, differently shaped anodes may be used. Also, while tantalum has been disclosed as the anode hereinbefore, other film-forming metals, particularly niobium, could also be used as the anode.

Furthermore, the invention is in no way to be limited to the particular shape of the can or housing illustrated, it being obvious to those skilled in the art that the wide variety of shapes and geometries may be used for the can or housing and still fall within the scope of the present invention.

I claim:

1. A capacitor which will withstand reversals of polarity comprising a first electrode normally the anode made of a film-forming metal selected from tantalum and niobium;

a second electrode normally the cathode comprising a structural support member selected from the group consisting of copper, silver, silver alloys, copper alloys and steel, and an essentially pore-free layer of metal selected from the group consisting of gold, platinum and gold-platinum alloys adhering to and covering a surface of said support member;

an aqueous electrolyte selected from the group consisting of sulfuric acid, nitric acid, phosphoric acid, alkali metal slats of said acids, and mixtures thereof, in contact with said first electrode and said pore-free layer of said second electrode, said electrolyte not appreciably dissolving metal from the second electrode pore-free layer and being substantially free of liberated oxygen at the interface with said layer upon intervals of reverse voltage;

2. A capacitor according to claim 1 in which substantially none of said second electrode is chemically or anodically dissolved in said electrolyte.

3. A capacitor according to claim 1 in which a finely divided material having chemical and electrochemical resistance to the electrolyte is applied to said layer.

4. A capacitor according to claim 3 in which said material is selected from the group consisting of finely divided platinum, finely divided gold, finely divided gold-platinum alloys, finely divided carbon and mixtures thereof.

5. A capacitor according to claim 1 in which a nonhalide electrolyte is used.

6. A capacitor according to claim 1 in which said electrolyte is sulfuric acid solution.

7. A capacitor according to claim 1 in which said support and said layer are formed as a bimetal composite.

8. A capacitor according to claim 7 in which said support and said layer and readily coformed mechanically.

9. A capacitor according to claim 1 in which said layer is from about 0.0001 to b 0.005 inches thick.